United States Patent [19]
Ou

[11] Patent Number: 4,848,827
[45] Date of Patent: Jul. 18, 1989

[54] EXTENSIBLE ROOF FOR AUTOMOBILE

[76] Inventor: Jan C. Ou, 4th Flr., No. 12, Alley 4, Lane 155, Pa Te Road, Sec. 3, Taipei, Taiwan

[21] Appl. No.: 180,627

[22] Filed: Apr. 4, 1988

Related U.S. Application Data

[63] Continuation of Ser. No. 20,204, Mar. 2, 1987, abandoned, which is a continuation of Ser. No. 737,097, May 23, 1985, abandoned.

[51] Int. Cl.$^4$ .......................... B60J 7/057; B60J 11/00
[52] U.S. Cl. .................... 296/99.1; 296/95.1; 296/97.1; 160/370.2; 135/88
[58] Field of Search ............... 296/95 R, 95 C, 97 R, 296/97 A, 97 G, 97 J, 99 R, 210, 223, 136; 160/370.2, DIG. 3, 130, 188, 218; 135/88, 89

[56] References Cited

U.S. PATENT DOCUMENTS

| | | | |
|---|---|---|---|
| 1,845,577 | 2/1932 | Berliawsky | 296/95 R |
| 3,137,491 | 6/1964 | Coenen | 296/223 |
| 3,292,971 | 12/1966 | Zucker | 296/99 R |
| 3,297,356 | 1/1967 | Francis | 296/95 R |
| 3,379,467 | 4/1968 | Brush | 296/95 R |
| 4,229,035 | 10/1980 | Newman | 296/95 R |
| 4,469,371 | 9/1984 | Jardin | 296/223 |

FOREIGN PATENT DOCUMENTS

| | | | |
|---|---|---|---|
| 683616 | 4/1964 | Canada | 296/97 G |
| 0034965 | 9/1981 | European Pat. Off. | 296/223 |
| 1530848 | 7/1969 | Fed. Rep. of Germany | 296/223 |
| 2937121 | 4/1981 | Fed. Rep. of Germany | 296/223 |
| 3310502 | 9/1984 | Fed. Rep. of Germany | 296/223 |
| 1155399 | 4/1958 | France | 296/210 |
| 31682 | 3/1980 | Japan | 296/99 R |
| 0135316 | 10/1981 | Japan | 296/210 |
| 0018021 | 1/1984 | Japan | 296/99 R |

*Primary Examiner*—Dennis H. Pedder

[57] ABSTRACT

The present invention relates to extensible roof structures for an automobile to provide a sun shade and snowshield over the windshield, side windows and rear window. The structure comprises a roof enclosure attachable to an automobile top which provides a hollow space housing slideable panels and a drive mechanism therefor. Actuation of the drive mechanism extends and retracts the panels through openings in the roof enclosure.

9 Claims, 10 Drawing Sheets

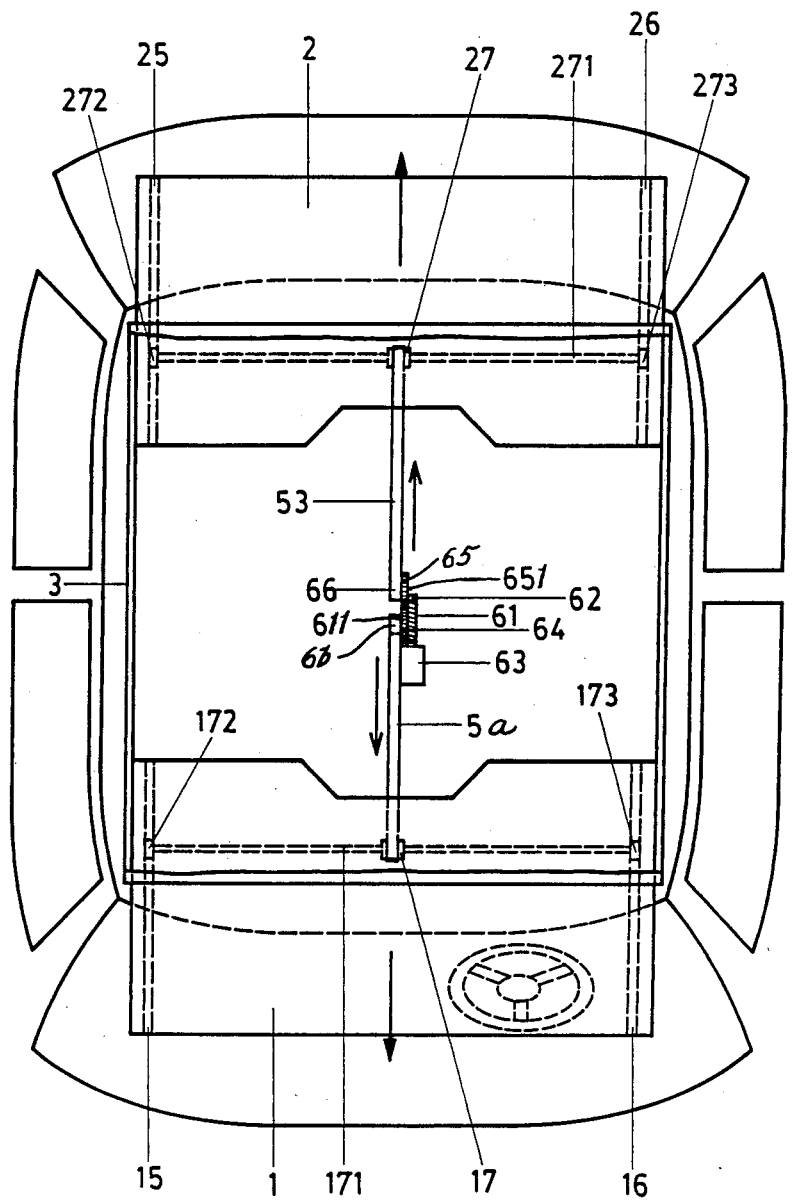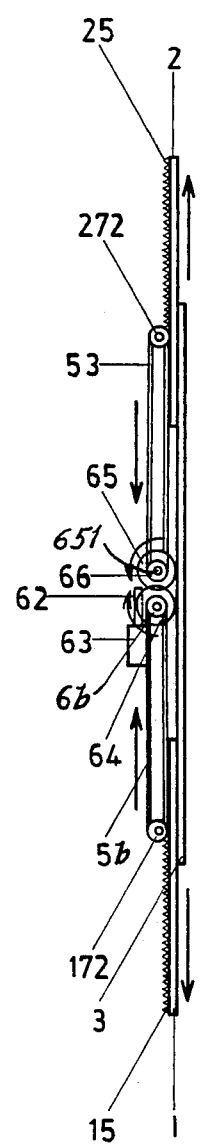
FIG 6
FIG 7

FIG. 14
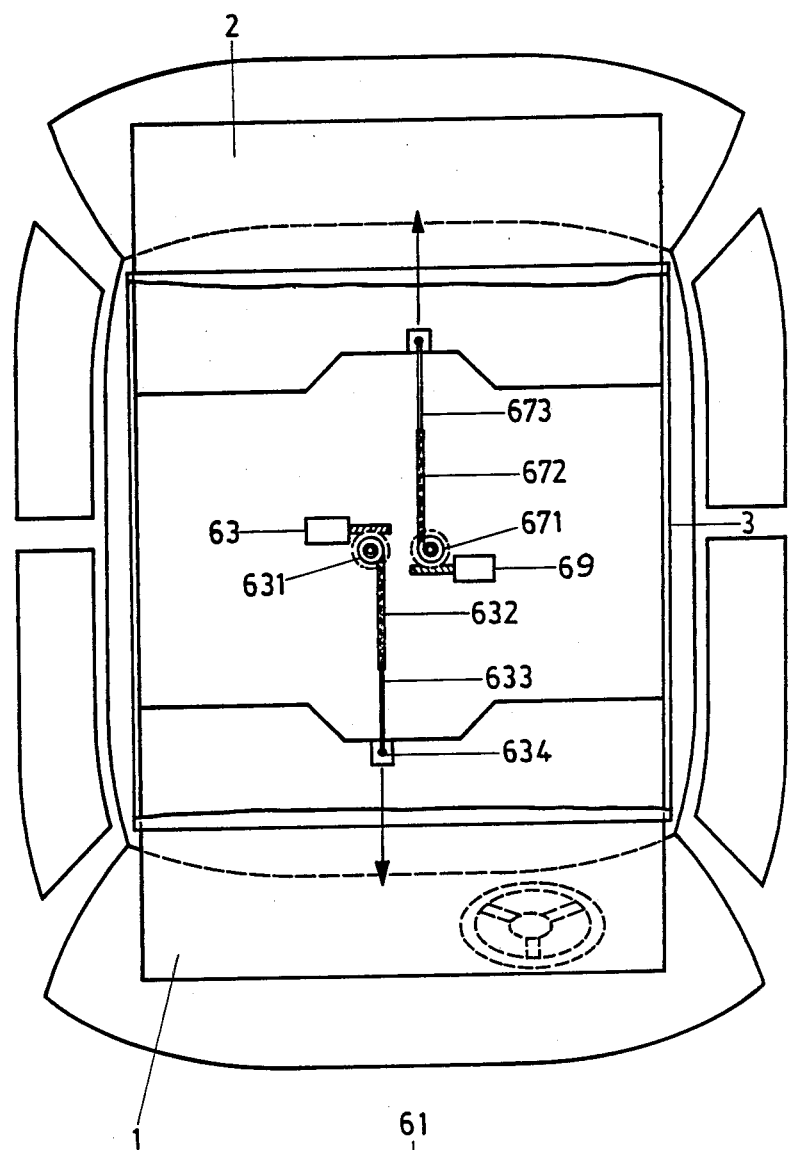
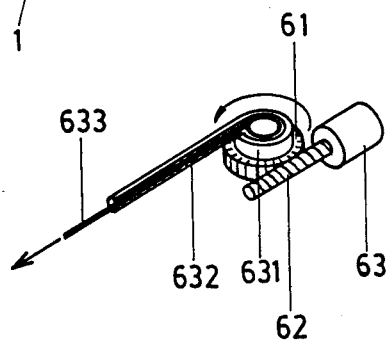
FIG. 9

EXTENSIBLE ROOF FOR AUTOMOBILE

This application is a continuation of application Ser. No. 020,204, filed Mar. 2, 1987, abandoned, which is in turn a continuation of Ser. No. 737,097, filed May 23, 1985, abandoned.

BACKGROUND OF THE INVENTION

1. Field of the Invention

The present invention relates generally to a vehicle top with a roof structure of movable panels, and more particularly to a roof structure with extensible roof panels to serve as a sun shade and snow shield over the windshield and rear window of an automobile.

2. Description of the Prior Art

There is a commonly encountered problem when parking a car in the outdoors under the hot summer sun; the temperature within the car goes up very quickly; seats, dashboard and steering wheel quickly become scorching, and people who enter the car instantly break out into perspiration, which is not a pleasant experience to the driver and passengers.

On the other hand, to leave a car parked in the outdoors in snowy winter presents another sort of problem, i.e. the falling snow or sleet piles up and covers the windshield and rear window. The driver has to scram and clear the windshield and rear window before driving.

These problems and the needs to alleviate them have been recognized long ago. Many different proposals have been explored over the years to address these concerns, however none of them was very effective or widely adopted. The common drawback of such proposals was that they only partially solved the problem, while creating other problems or negative side effects which made them impractical.

For example, U.S. Pat. No. 4,229,035 to Newman discloses a vehicle windshield rain deflector system which employs a hydraulic pump to actuate a pair of hydraulic cylinders to move a rain deflector in front of the windshield. It can only cover a small portion of the windshield area against head on falling rain, little use if the wind blows from a side direction, furthermore the always present rain deflector in front of the windshield becomes an annoying hindrance to the vision of the driver. Most drivers would rather have a clear and unobstructed front view during driving. The always present shadow from the rain deflector on the windshield becomes another annoying drawback when the driver or front seat passenger wants to enjoy the sunshine in the morning or afternoon when the sunshine is not very hot.

Similarly, U.S. Pat. No. 3,379,467 to Brush discloses a windshield visor which features a permanent visor panel to cover the whole windshield area. The driver's view is significantly confined. While it can prevent glare from the high noon sun, it also prevents the driver from enjoying sunshine when it is not very strong in the morning or afternoon.

U.S. Pat. No. 3,297,356 to Francis discloses an automobile windshield rain visor featuring a removable tubular member attached to the car top by means of vacuum cups or magnets. It must be installed or removed manually every time it is used, and it is quite bulky and inconvenient, either to use or to store. None of the aforesaid proposals has been widely accepted in the market place.

In order to solve the foregoing problems, there are a number of products being marketed, through none of them is very effective. It also happens tht those products which can reduce the sun heat transmitting into car cannot prevent snow from falling onto it.

For example, some devices provides a sun shade internally mounted on the car window, of either curtain or shutter types; some others provide externally mounted sun visor which is, in general a narrow strip or plate, fixed transversely on the front edge of the car roof and extended over the windshield and can only cover a small portion of the windshield area. As it is fixed and extended in the forward direction, it will increase the aerodynamic drag force aero when the car is moving forward; thus, fuel consumption will be increased. Still, others provide a fixed shutter-type louvered shade panel mounted externally on the rear window which has no effect on the windshield, but has the drawback of partially blocking the rearview of the driver. With regard to the canvas car cover, it is so clumsy to unpack and spread over the car, and so easy to collect dust and dirt, it is not widely used.

As to the movable car roof, there are many different types available relating to the sun roof feature. However a sun roof feature is for the purpose of receiving sunshine into the car, not for providing a sun shade or a snow shield to the windshield and rear window. Furthermore, a sun roof feature mostly confines the motion of the roof panel between the windshield and the rear window, not extending over the windshield and rear window areas.

This invention provides an extensible car roof, with slidable front and rear panels sandwiched in a car roof enclosure and driven by a D.C. motor. By pressing a two-way switch, the D.C. motor will move the front and rear panels out of the roof enclosure to hang over the windshield and rear window respectively to serve as a sun shade or a snow shield. Upon throwing the two-way switch in the other direction, the D.C. motor will rotate in a reversed direction; thus, the front and rear panels will be retracted into the roof enclosure for storage and to reduce the drag force when car is moving forward. Thereby, this invention provides a ready and handy sun shade and snow shield for a car so as to give the driver and passengers a more comfortable and convenient drive and ride in the hot summer and in the snowy winter.

SUMMARY OF THE INVENTION

This invention pertains to a car top with a roof structure of movable panels. The object of the present invention is to provide a retractable sun shade and snow shield for the windshield and rear window of a car when parked in an outdoor area. With this invention, a sheet metal roof enclosure is mounted to and covers the car top to form a hollow space. The roof enclosure has two parallel and longitudinal side frames, with a front and a rear and opening transversely disposed. A front roof panel and a rear roof panel are sandwiched between the parallel side frames of the roof enclosure, and can slide out of the roof enclosure through the front and rear end openings respectively. There is a power actuating mechanism to move the ront and rear roof panels, which includes sprockets rotatably installed at each opening end at both side frames and above the front and rear roof panels. A cogged belt is wound around the two sprockets at the front and rear ends of each side of the roof enclosure. Thus, the two sides of each cogged belt can make a linear motion in the opposite direction concurrently between the two sprockets at the front and rear ends. On one side of a cogged belt, there is attached a clamp which grips a stub pin on the inner side of the front roof panel; on the opposite side of same cogged belt there is attached another clamp which grips a stud pin on the inner side of the rear roof panel.

There is a power cogged belt wound around the two sprockets at the rear ends. The power cogged belt is further engaged in the middle to a power sprocket with two tensioners. The power sprocket is attached to a reducing gear that engages a worm gear, which in turn is driven by a reversible D.C. motor. The D.C. motor connects to a car battery via a two-way switch.

When the two-way switch is turned on, the D.C. motor, and the power sprocket rotates and drives the power cogged belt, which in turn drives the two sprockets at the rear end, with the cogged belts at both sides of the roof enclosure moving concurrently. The clamps attached on the cogged belts grip both sides of the ront and rear roof panels, and drive them out of the roof enclosure.

The front and rear roof panels being partially moved out of the roof enclosure and extended above the windshield and rear window respectively, can serve as a sun shade or snow shield for the car. The hollow space between the roof enclosure and the car top can serve as an additional heat barrier of sun heat radiated toward car.

Upon throwing the two-way switch the other way to reverse the rotating direction of the D.C. motor, the power sprocket and power cogged belt will move in the reversed direction, the cogged belts at both sides and the clamps thereupon will move in reversed direction, too. Thus the front and rear roof panels will be retracted into the roof enclosure for storage so as to reduce the aerodynamic drag force when the car is moving forward.

Another object of the present invention is to make the extensible roof a self contained unit with the roof enclosure, so as to be produced separately and independently, which can be mounted and fixed on a car top when necessary. The two-way switch may be connected with the car battery with a plug via the cigarette lighter on the dashboard of the car.

A further object of the present invention is to make the extensible roof a portable unit with the roof enclosure. With a multiple number of fasteners attached to the outside of both side frames to grip the dran gutters at both sides of the car top, the roof enclosure can be held firmly on the car top. Upon loosing the fasteners, the roof enclosure can be removed from the car top for off season storage.

A still further object of the present invention is, in addition to front and rear end openings with front and rear roof panels to extend and hang over the windshield and rear window, to provide two side openings in the roof enclosure, and two side roof panels, which can be slid out of the roof enclosure and hung over both side windows to serve as sun shades and snow shields; thus, it will provide more coverage and shelter for a car.

A still further object of the present invention is to provide a flexible installation by means of attaching the roof enclosure on a conventional car roof carrier rack, the roof carrier rack can adjust transversely according to the size of car top and have both the fasteners grip the drain gutter on both sides of car top to hold the roof enclosure firmly on car top.

BRIEF DESCRIPTION OF THE DRAWINGS

FIG. 6 is a schematic top view of a further embodiment of the present invention.

FIG. 7 is a schematic side view of the embodiment of FIG. 6.

FIG. 9 is a close up view of a telescopic drive means of the present invention.

FIGS. 13 and 14 are schematic top views of further embodiments of the invention.

DETAILED DESCRIPTION OF THE PREFERRED EMBODIMENTS

Figure 1:
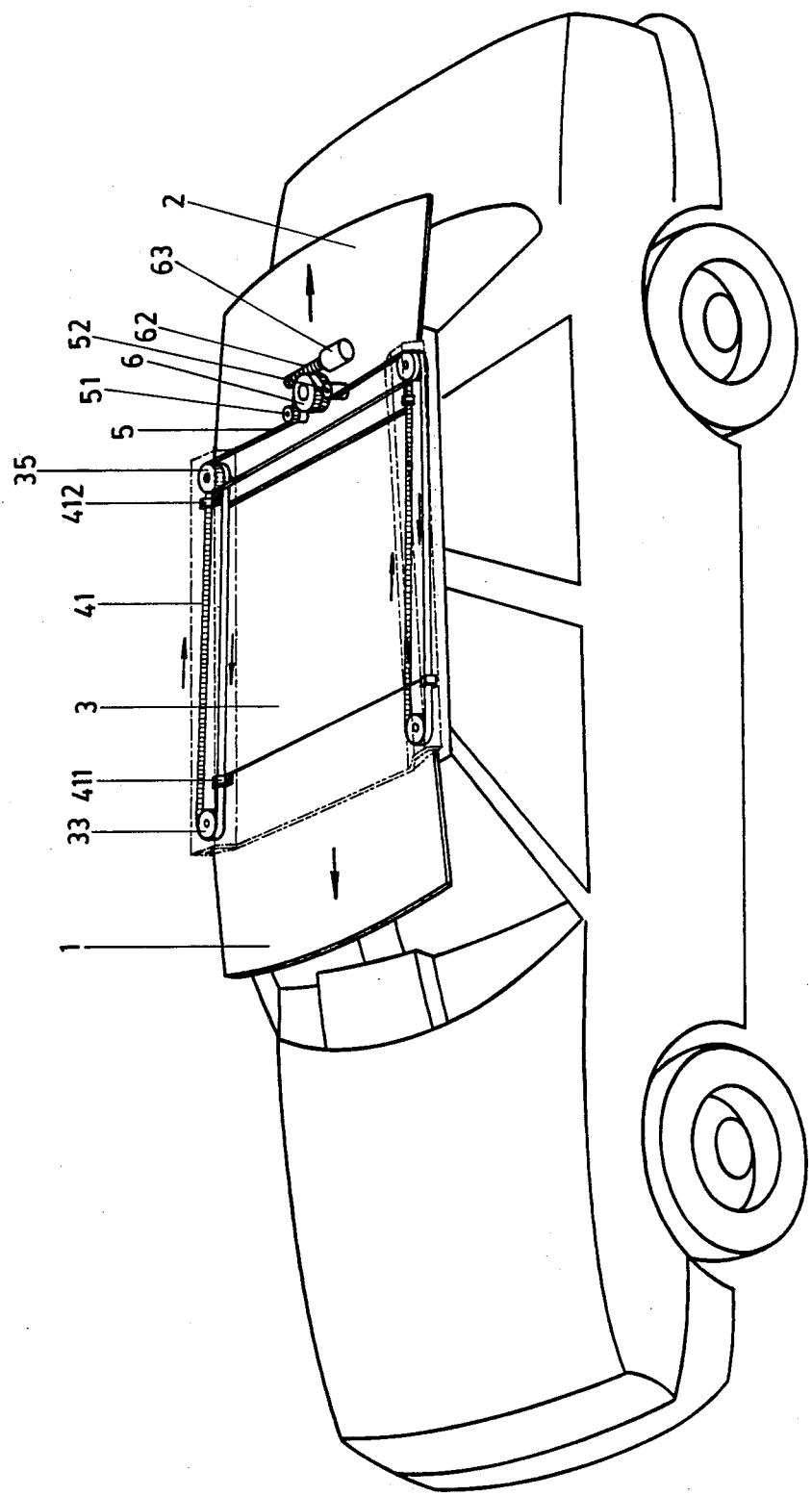
FIG. 1 is a schematic and perspective view of an embodiment of the present invention, being set up in use.

The various embodiments of the present invention are described in detail herein after. The embodiments depict the examples of the present invention which may be embodied in other forms, some of which may be different from the illustrative embodiments. However, the specific structural and functional characteristics disclosed herein are representative, and are deemed as a basis for the claims herein which define the scope of the present invention.

Referring to FIGS. 1, 2, 3, and 4, there are shown the overall perspective, the sectional and the cutaway views of the embodiment. Broadly speaking, this invention comprises three sets of components, the roof enclosure 3, a front roof panel 1 and a rear roof panel 2, and a power actuating mechanism which constitutes a reversible D.C. motor 63, which drives a worm gear 62, which in turn engages a reducing gear 61; a power sprocket 6 is attached to reducing gear 61 on the shame shaft. Also included in the mechanism are a power cogged belt 5, side cogged belts 41, 42 and the side sprockets 33, 35, 34 36 which will be explained in detail hereunder. D.C. motor 63 is mounted firmly on roof enclosure 3, and is connected with a car battery via a two-way switch (not shown). Roof enclosure 3 is preferably formed of sheet metal (steel or aluminum alloy). and a hollow space is formed underneath when it is mounted on the car top; roof enclosure 3 has transverse openings at the front end and the rear end respectively, and has two longitudinal and parallel side frames 31, 311 which have "E"-shaped cross section channels with the center extended flanges pointing toward the inside of the hollow space. Roof enclosure 3 can be fixed permanently on the car top by welding or screw and bolt, or can be made portable and removable from the car top by installing multiple numbers of fasteners 37, 371, 372 on each side frame 31 and 311 to grip the drain gutter on each side of the car top to hold the roof enclosure 3 firmly when in use, forming a hollow space between the enclosure 3 and the car top. Loosening of fasteners 37,371,372 allows roof enclosure 3 to be removed from car top for off season storage. A further alternative is to attach roof enclosure 3 on a roof carrier rack 374 by screw 376, roof carrier rack 374 has its fastener end 377, 378 to grip the drain gutter on the car top to hold the roof enclosure 3 firmly thereto. Sleeve 375 allows roof carrier rack 374 to make transverse adjustments to fit different sizes of car tops. Roof panels 1 and 2 are sandwiched in the parallel side frames 31 and 311 in the lower channel of the "E" cross section, and are slidable out of the front and rear openings 1a and 2a respectively.

There is a sprocket rotatably installed in the upper channel of the "E" cross section at each end of side frames 31, 311; the sprockets 33, 35 are on one side, while sprockets 34, 36 are on the other side; there is a cogged belt 41 wound around sprockets 33, 35 on one side, and a cogged belt 42 wound around sprockets 34, 36 on the other side; thus, the two sides of each cogged belt 41 (or 42) can have linear motion in opposite directions between the two sprockets 33, 35 (or 34, 36) at both ends.

Figure 2:
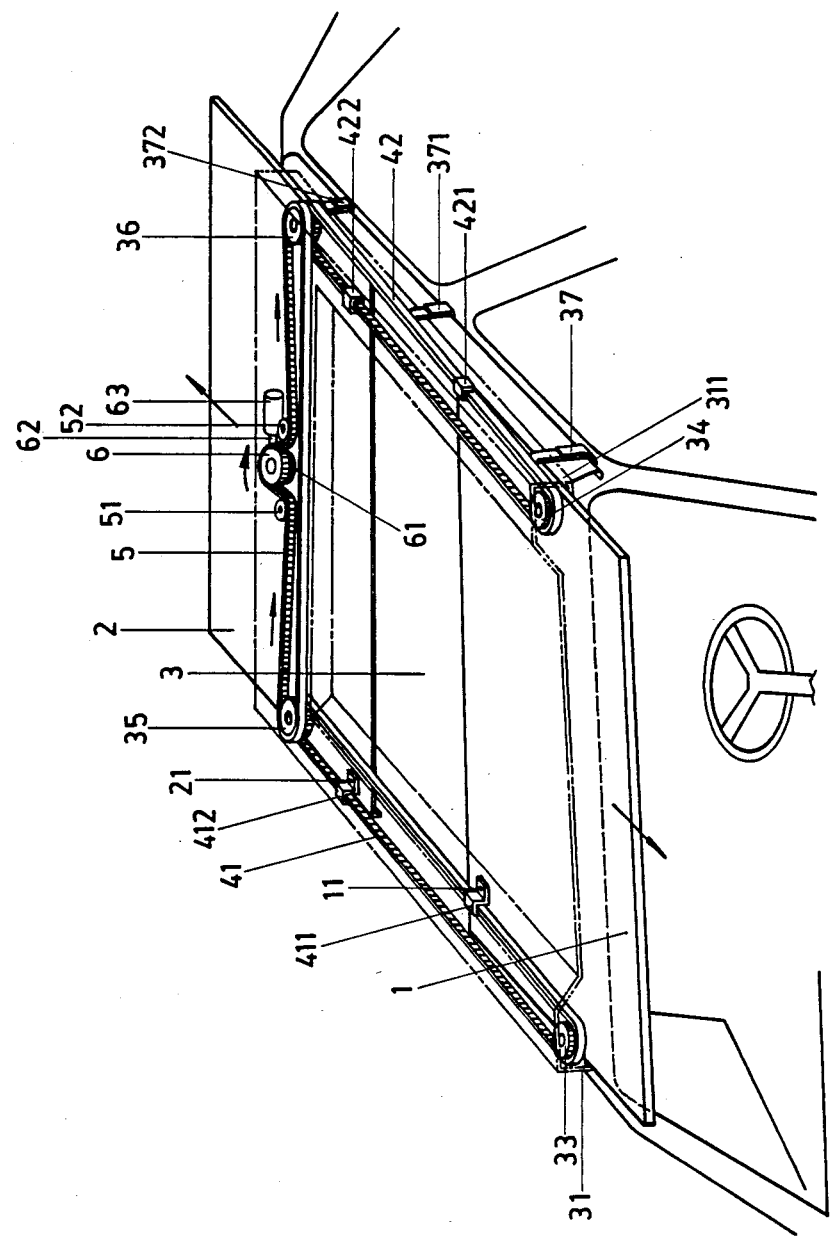
FIG. 2 is a close-up perspective view of an embodiment of the present invention.

Referring to FIGS, 2, 3 and 4, on one side of cogged belt 41, there is a clamp 411 attached to and gripping a stud pin 11 which is fixed on the inner side of the front roof panel 1; the opposite side of cogged belt 41 also has a clamp 412 attached to and gripping a stud pin 21 on the inner side of rear roof panel 2; likewise, referring to FIG. 2, 3, on cogged belt 42, there is a clamp 421 which grips a stud pin 12 on front roof panel 1, and a clamp 422 which grips a stud pin 22 on rear roof panel 2; thereby, when the sprockets at both sides turn in the same direction, the cogged belts and the clamps thereupon will grip the front and rear roof panels 1, 2 at both sides, and move front and rear roof panels 1, 2 in longitudinal directions concurrently.

Theree is a power cogged belt 5 wound around the sprockets 35, 36 at the rear ends of the side frames 31 and 311 respectively. The power cogged belt 5 is further engaged on a power sprocket 6 by two tensioners 51, 52; as mentioned above, the power sprocket 6 is attached to the reducing gear 61. thereby, when two-way switch is thrown to one side, D.C. motor 63 rotates to drive worm gear 62 and to turn the reducing gear 61 and the power sprocket 6, which moves power cogged belt 5 which in turn rotates sprockets 35 and 36 simultaneously, the cogged belts 41, 42 at both sides also being driven concurrently. Clamps 411, 421 thereupon force front panel 1 to move forward and out of roof enclosure 3 at opening 1a, while clamps 412, 422 drive the rear roof panel 2 rearward and out of the roof enclosure 3 at opening 2a at the same time. The front roof panel 1 with its inner side sandwiched between the side frames 31, 311 of the roof enclosure 3, and its front portion extended out and above the windshield of the car serves as a sun shade or a snow shield for the windshield. Likewise, the rear roof panel 2 is extended over the rear window in the mean time to serve as a sun shade or a snow shield for the rear window.

By throwing the two-way switch to another side, the D.C. motor 63 will rotate in the reverse direction, so does the power sprocket 6, which in turn drives the power cogged belt 5 in the reverse direction, which makes sprockets 35, 36 rotate in the reverse direction, too; thus the cogged belts 41, 42 and the clamps thereupon will pull the front roof panel 1 and the rear roof panel 2 back into roof enclosure 3 for storage again so as to reduce the air drag force when the car moves forward. The enclosure 3 may be removed from the car top for off season storage to reduce the weight of car and to reduce fuel consumption.

In addition to the roof panels 1, 2, which can be extended out of the roof enclosure 3 to block sun from reaching the windshield and rear window thereby reducing the temperature within the car, the hollow space formed between roof enclosure 3 and the car top can also serve as an additional barrier of heat transmission from the sun, since air is a poor heat conductor. Thus, the temperature within the car can be further reduced when parking in the outdoor area under the summer sun.

When using the roof panels 1, 2 as snow sield in snowy winter, the extension roof panels 1 and 2 can be retracted into the roof enclosure 3 or remain in the extended position when the car is in motion, when the road condition is slippery and car speed is relatively slow, as the air drag force is not heavy anyway.

Figure 4:
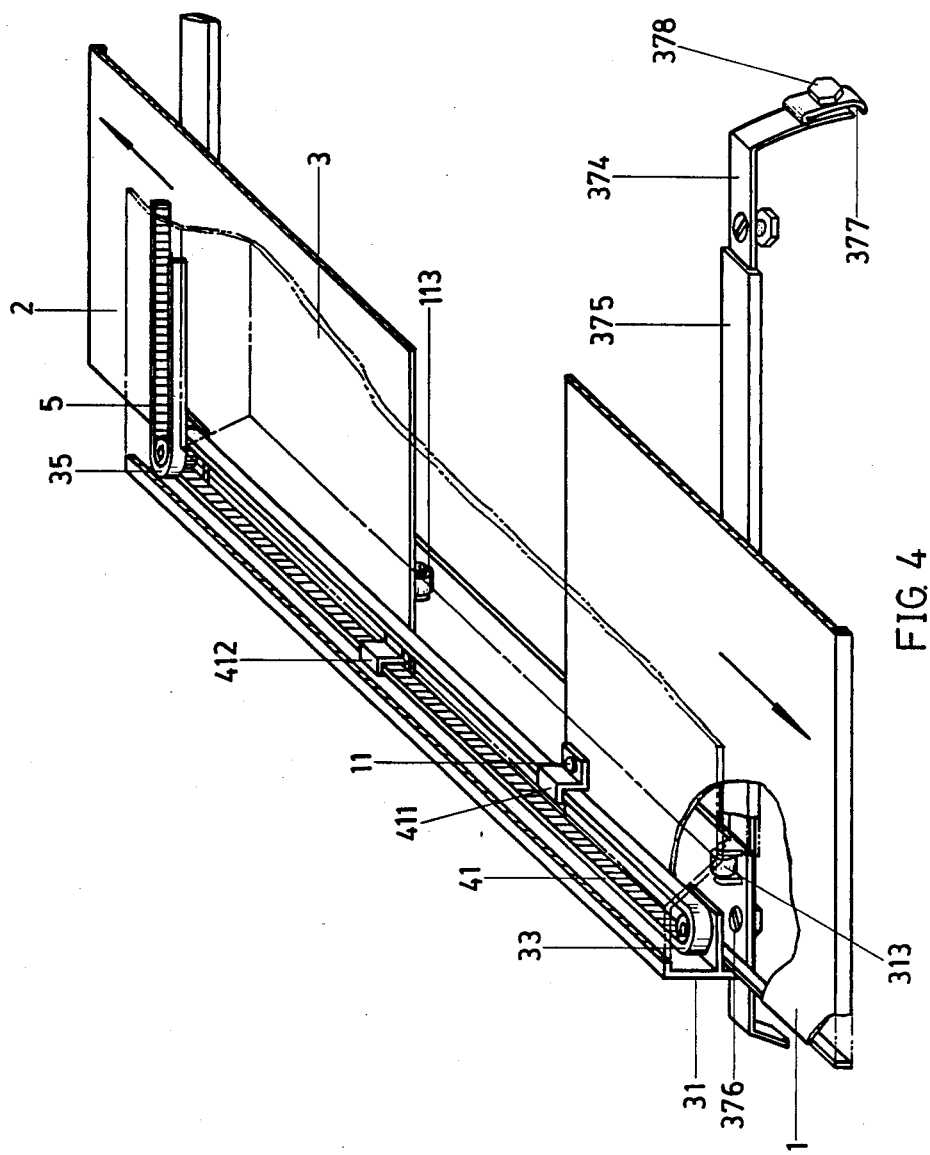
FIG. 4 is a fragmentary cutaway view of an embodiment of the present invention.
Figure 13:
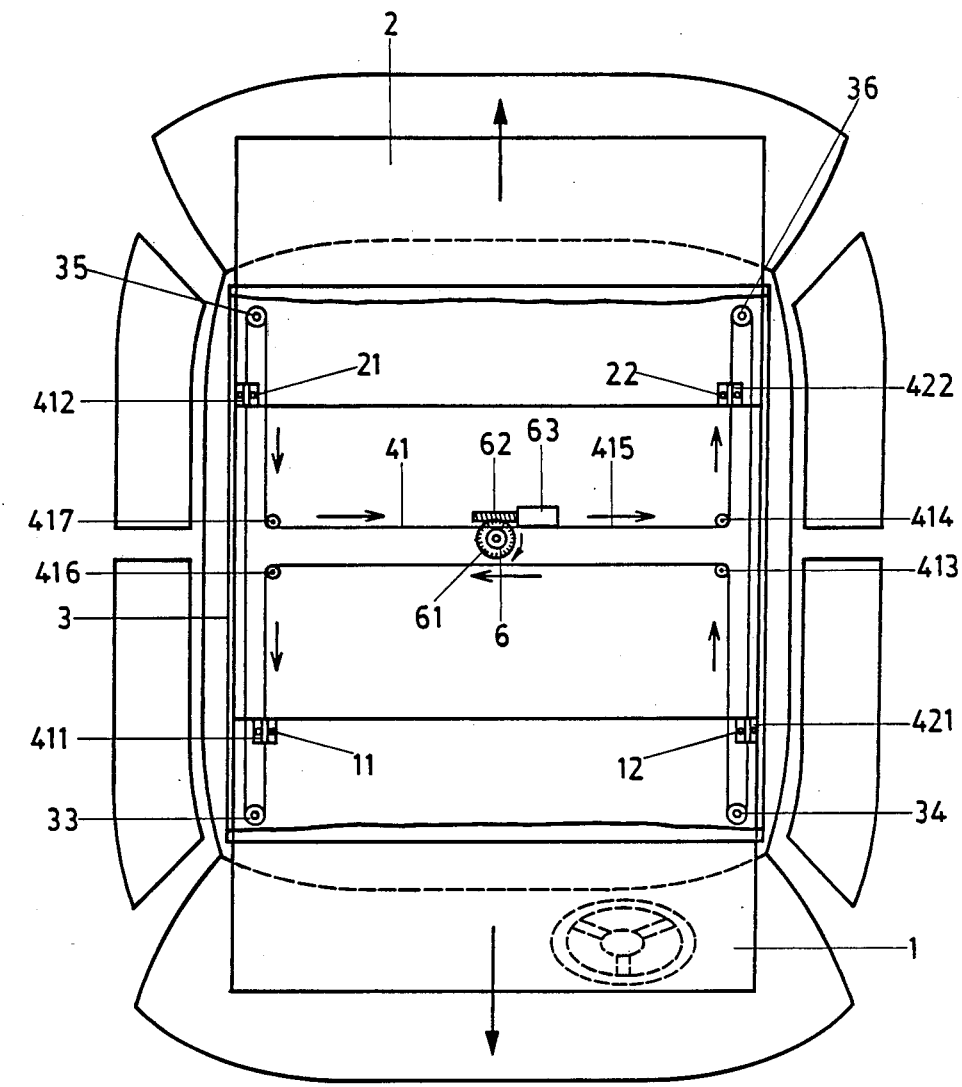
Figure 5:
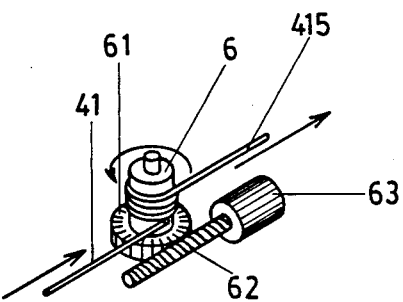
FIG. 5 is a perspective close up view of a drive means of the invention.
Figure 8:
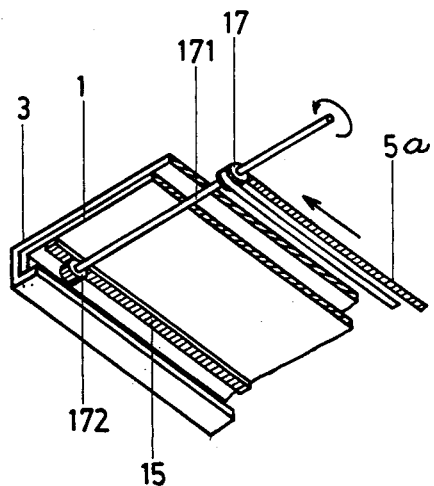
FIG. 8 is a fragmentary cutaway view of a further embodiment of the present invention.

FIG. 5 illustrates another embodiment of the present invention. Front roof panel 1 and rear roof panel 2 are slidable in roof enclosure 3 like the embodiment shown in FIG. 1-4, the main difference being the power actuating mechanism. There are pulleys 33, 35, 34, and 36 at both ends of each of side frames 31 and 311 of the roof enclosure 3, and they are rotatably installed above front and rear panels 1, 2. A driving cord 41 is wound around the two pulleys 33, 35 on side frame 31 then has one end wound around an idler 417 in the middle of that side, and tied at a drive shaft 6 in the middle of roof enclosure 3. Drive shaft 6 is fixed on a reducing gear 61 which engages a worm gear 62 and is driven by a reversible D.C. motor 63 mounted in the center of roof enclosure 3. The other end of the driving cord 41 is wound around another idler 416 in the middle of same side, then goes to the other side of roof enclosure 3 and winds around another idler 413, pulleys 34, 36 at both ends of side frame 311, and via another idler 414 in the middle and finally reaches drive shaft 6, winds around shaft 6 a number of turns and is tied to it as indicated by FIG. 5.

There are clamps 411, 421 attached to the driving cord 41 at both sides, which grip respectively stud pins 11 and 12 at both sides of inner edge of front roof panel 1. Likewise there are clamps 412, 422 attached to the driving cord 41, which grip stud pins 21, 22 at both sides of the inner edge of rear roof panel 2.

Figure 3:
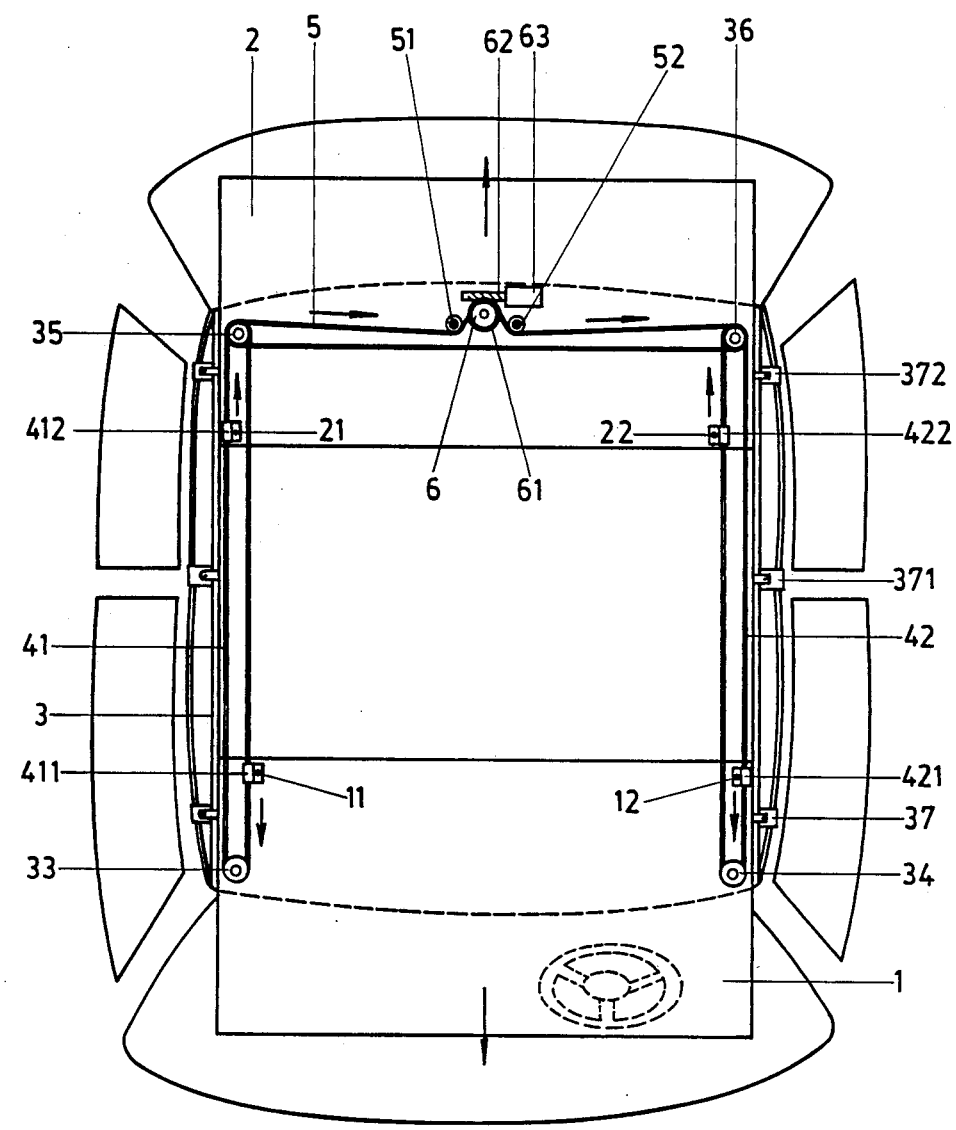
FIG. 3 is a schematic top view of an embodiment of the present invention.

When a two-way switch as in FIG. 3 is turned on, the D.C. motor 63 will rotate in the direction as indicated in FIG. 5. The driving cord at end 41 becomes the take-up side, being wound on drive shaft 6; at the same time, the driving cord at end 415 becomes the releasing side to unwind from drive shaft 6. Thus, the driving cord and clamps 411, 421 move simultaneously forward and grip the front roof panel 1 at both sides to move it forward and out of roof enclosure 3. In the mean time, the driving cord at clamps 412, 422 grips rear roof panel 2 at both sides and moves it rearward and out of roof enclosure 3. The front and rear roof panels 1, 2 being moved out and extended over the windshield and the rear window can serve as a sun shade or a snow shield.

Upon throwing the two-way switch to the reverse position to have the D.C. motor 63 rotated reversely, the driving cord end 41 becomes the releasing and unwinding end, while driving cord end 415 becomes the take-up and winding end and both the front and rear roof panels 1, 2 will be retracted into the roof enclosure 3 for storage.

This embodiment looks somewhat like the conventional sun-roof feature. However there are differences in their function and characteristics. A sun-roof feature is intended to receive sun shine into the car, and roof panel motion is limited to within the car top area. The present invention is to prevent sunshine and snow from reaching the windshield and rear window, the roof panels are extended out beyond the car top area when in use.

FIG. 6, 7, 8 illustrate a further embodiment of the present invention. Front roof panel 1 and rear roof panel 2 are slidable in roof enclosure 3 like the embodiment shown in FIG. 1-4, the main difference is the power actuating mechanism. In the center of roof enclosure 3, a reversible D.C. motor 63 is mounted to drive a worm gear 62 which engages a reducing gear 61. On the shaft 611 of reducing gear 61, a front gear 64 and a front power sprocket 6 are mounted. The front gear 64 engages a rear gear 65 on a rear shaft 651, on which a rear power sprocket 66 is mounted. An endless front cogged belt 5a winds around the front power sprocket 6 and a front end sprocket 17 which is installed in the middle of the front end of roof enclosure 3 and is under front roof panel 1. A front spindle 171 extends horizontally and tranversely from front end sprocket 17, and has pinions 172, 173 attached at each end. Pinions 172, 173 are engaged with the gear racks 15, 16, which are longitudinally attached underneath at the two side edges of front roof panel 1. Likewise, there is a rear cogged belt 53 wound around the rear power sprocket 66 and a rear end sprocket 27. A rear spindle 271 having pinions 272, 273 at each end engages gear racks 25, 26 which are longitudinally attached underneath rear roof panel 2.

When a two-way switch 67 is turned on, D.C. motor 63 will rotate to drive the front gear 64, and the rear gear 65 will rotate in the opposite direction; therefore, the front power sprocket 6 and the rear power sprocket 66 will be rotated in opposite directions, too. Through the cogged belts 5a, 53, front end sprocket 17 and rear end sprocket 27 will be turned in opposite directions simultaneously, as will the pinions 172, 173 and 272, 273 attached to them by the spindles 171, 271. The gear racks 15, 16 will be moved forward, the gear racks 25, 26 will be moved rearward, and the front roof panel 1 and rear roof panel 2 will be extended out of roof enclosure 3 accordingly.

By throwing the two-way switch to the other side to reverse the rotating direction of D.C. motor 63, the front roof panel 1, and the rear roof panel 2 can be retracted into roof enclosure 3 for storage.

FIG. 9 illustrates a still further embodiment of the present invention. Front roof panel 1 and rear roof panel 2 are slidable in roof enclosure 3 like the embodiment shown in FIG. 1-4, the main difference is the power actuating mechanism. In the center of the roof enclosure 3, there are mounted two reversible D.C. motors 63, 69.

Somewhat like a conventional automatic car radio antenna, the D.C. motor 63 drives a worm gear 62 and a reducing gear 61, with a hollow cylinder 631 mounted on the reducing gear 61. A flexible coil 632 is wound around inside hollow cylinder 631 with one end fixed on the inside wall of the hollow cylinder 631, while the other end of the coil 632 makes an exit from hollow cylinder 631 through an opening at the outside rim of hollow cylinder. The exit end of the coil 632 is inserted into a telescopic tube 633 and secured to the inmost tube, the inmost tube has its other end fixed at the middle of the inner edge 634 of the front roof panel 1, the telescopic tube 633 laying in a longitudinal direction with its outside sleeve held stationary on the frame of the D.C. motor 63.

When a two-way switch as in FIG. 3 is turned on to have the D.C. motor 63 rotate, the worm gear 62 and the reducing gear 61 and the hollow cylinder 631 will rotate accordingly, the coil 632 will be unwound and extended through the exit opening to push the telescopic tube 633 to extend, thus move the front roof panel 1 forward and out of the roof enclosure 3.

Upon throwing the two-way switch to the other position to reverse the rotating direction of D.C. motor 63, the hollow cylinder 631 will rotate in a reversed direction and wind the coil 632 to retract the telescopic tube 633, which in turn moves the front roof panel 1 back into the roof enclosure 3.

Likewise, D.C. motor 63 drives a hollow cylinder 671, and a flexible coil 672 to push or retract the telescopic tube 673, which in turn pushes or retracts the rear roof panel 2 out of or into the roof enclosure 3.

This embodiment enables the front roof panel 1 and rear roof panel 2 to be driven independently by separate D.C. motors.

FIG. 4 also illustrates a feature of the roof panel sliding mechanism. In order to reduce friction and to facilitate the roof panel motion, a roller 313 is installed at the opening end 1a of the enclosure 3 at either side with front roof panel 1 riding on roller 313. There is another roller 113 which is installed underneath the front roof panel 1 (like that in FIG. 4 which is shown under rear roof panel 2). Therefore both rollers 313, 113 will support front roof panel 1 during sliding in or out of roof enclosure 3.

As another embodiment to serve the same function of reducing the friction force of roof panel movement, a low friction synthetic resin (e.g. nylon pad) can be used to replace rollers 313 and 113 mentioned above.

Likewise, the same structure can be applied to rear roof panel 2 to facilitate the panel movement.

Figure 10:
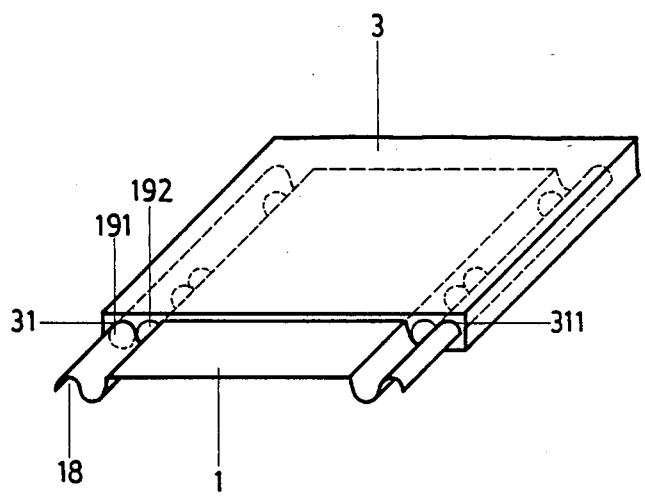
FIG. 10 is a fragmentary schematic view of an embodiment panel of this invention.

FIG. 10 illustrates a further embodiment of the roof panel sliding mechanism to facilitate low friction between the roof panels and the roof enclosure 3. Front roof panel 1 has an "S" curve groove 18 at each side, and is longitudinally slidable in the side frames 31 and 311. There are a plurality of steel balls 191, 192 held in the upper and lower "S" curve grooves 18, and sandwiched between front roof panel 1 and side frames 31 and 311 of the roof enclosure 3. Therefore, the front roof panel 1 can be slid in and out of the roof enclosure 3 with little friction. Likewise, the same structure can be applied to rear roof panel 2.

Figure 11:
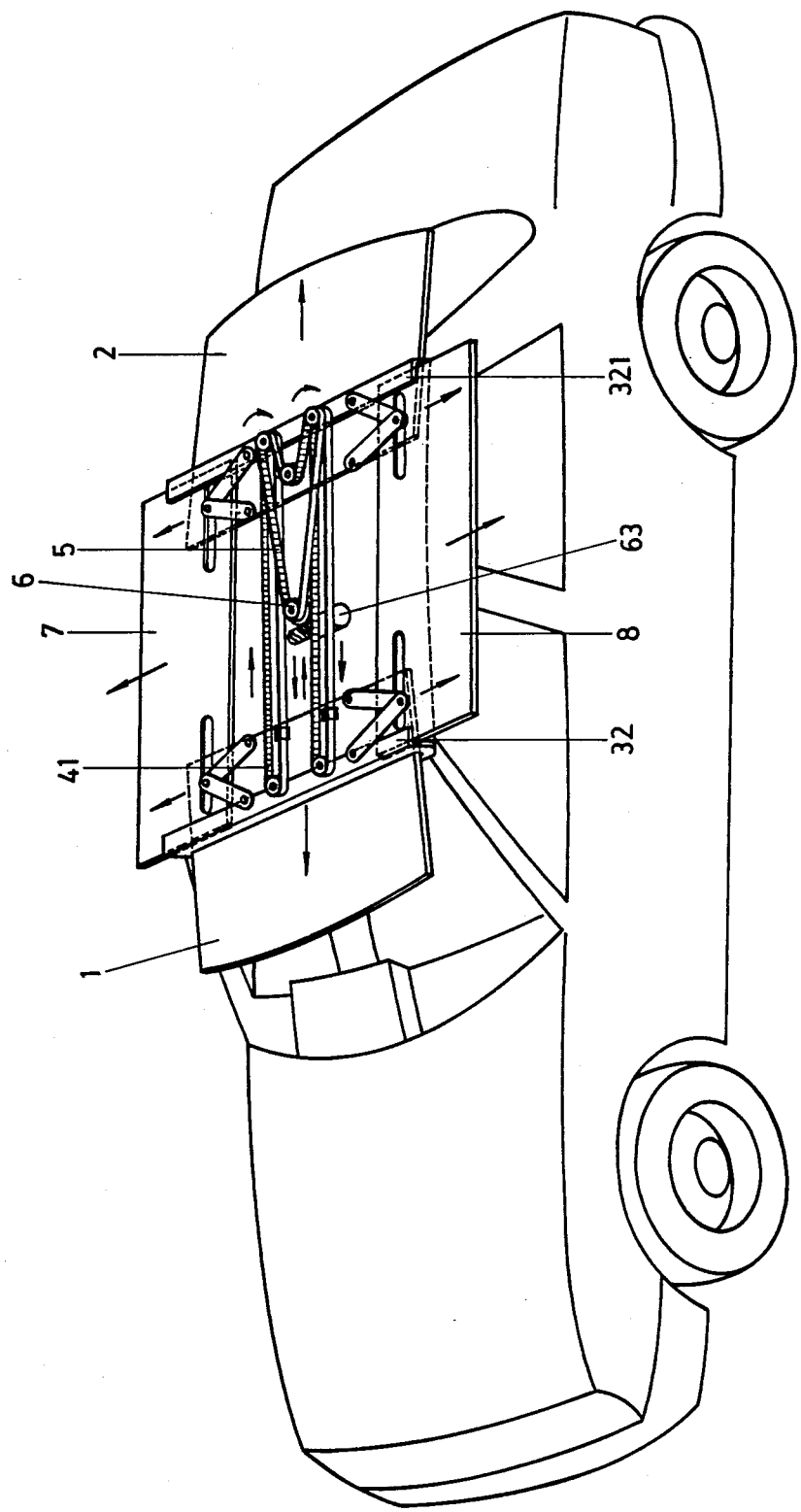
FIG. 11 is a schematic and perspective view of an alternative embodiment of the present invention to being set up in use.
Figure 12:
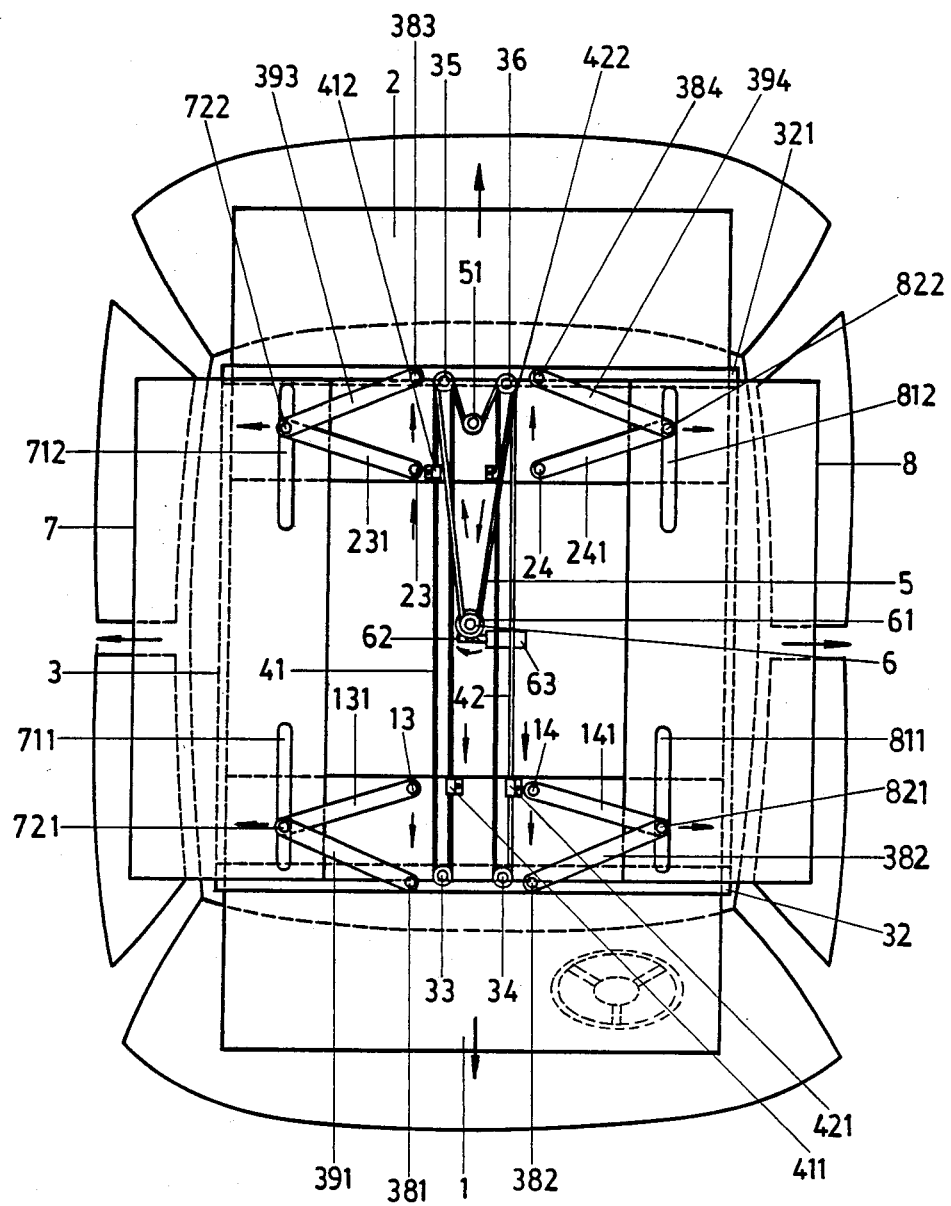
FIG. 12 is a schematic top view of the embodiment of FIG. 11.

FIG. 11, 12 illustrate another embodiment of the present invention, showing perspective and top views. Partially like the foregoing embodiments depicted in FIG. 1-4, there are front roof panel 1 and rear roof panel 2 that are longitudinally slidable within roof enclosure 3. There is a reversible D.C. motor 63 driving a worm gear 62 and reducing gear 61, and driving a power sprocket 6, which moves power cogged belt 5, which in turn drives two rear end sprockets 35, 36 through a tensioner 51. Thus the two cogged belts 41, 42 will be moved at the same time, and the clamps 411, 421 thereupon will move the front roof panel 1 forward, while clamps 412, 422 will drive the rear roof panel 2 rearward.

In addition, in roof enclosure 3 there are two parallel and transversely disposed end frames 32, 321 with two side openings disposed in a longitudinal direction; and there are two side roof panels 7, 8, which are sandwiched in the end frames 32, 321 and are able to slide out of roof enclosure 3 through side openings respectively.

On the inner sides of the side roof panels 7, 8, there are longitudinal slots 711, 712, on panel 7 and 812 on panel 8 at both ends respectively. There is a slidable roller pin inserting into each slot, as depicted by 721, 722, 821, 822. There are two linkage bars pivotally hinged on each roller pin, for example, 391, 131 on 721. The other end 381 of linkage bar 391 is pivotally hinged on end frame 32, while the other end 13 of the linkage bar 131 is pivotally hinged on the inner side of front roof panel 1. Both linkage bars 391, 131 are hinged angularly on the roller pin 721. Likewise, the roller pin 821 has one linkage bar 392 with one end 362 hinged on end frame 32; another linkage bar 141 with another end 14 hinged on front roof panel 1. Likewise, the same structure is applied to rear roof panel 2 and the side roof panels 7, 8.

When D.C. motor 63 rotates to move the front roof panel 1 and rear roof panel 2 outward, the pivots 13, 14 at front roof panel 1 will move close to the end frame 32. Thus, the linkage bar 131 will move close to bar 391, and the linkage bar 141 will move close to bar 392. The roller pins 721, 821 will be moved outward in a sideways direction; likewise, roller pins 722, 822 at rear end will also be moved outward in a sideways direction concurrently. Therefore, the side panels 7, 8 will be moved out of the roof enclosure 3, and hang over the side windows of the car to serve as sun shades or snow shields for the side windows.

When the front roof panel 1 and the rear roof panel 2 are retracted into roof enclosure 3, both linkage bars hinged on each roller pin in each slot will be stretched out to a larger angle, which in turn will move the roller pins inward and thus, will move the side roof panels 7, 8 back into roof enclosure 3 for storage.

I claim:

1. An extensible roof structure for an automobile comprising:
   (i) a roof enclosure mountable on and forming a hollow space with an automobile top and having transverse openings at the front and rear ends with two longitudinal and parallel side frames having flanges and channels to define an "E" shaped cross section having upper and lower channels, the flanges being horizontal and extending toward the inside of said hollow space;
   (ii) front and rear roof panels sandwiched between said two parallel side frames and slideable longitudinally in the lower channel of said "E" cross section so as to be extendable and retractable through said transverse openings; and
   (iii) a power actuating mechanism comprising at least one reversible D.C. drive motor and power transmission means adapted to extend and retract said roof panels out of and into said roof enclosure through said transverse openings, said at least one motor adapted to be connected to a battery via a two-way switch, said power transmission means comprising a sprocket rotatably mounted in the upper channel of said "E" shaped cross section side frames at each end thereof, a cogged belt being wound around each set of two sprockets in one side frame, each belt being stretched horizonftally and longitudinally abaove said front and rear roof panels and having means attached thereto for gripping said panels, a power cogged belt being wound about the two rear sprockets and extending transversely therebetween to engage a centrally disposed power sprocket which is attached to a reducing gear which engages a worm gear which in turn is rotated by said D.C. motor, said D.C. motor and gearing means further being mounted on said roof enclosure.

2. An extensible roof structure for an automobile as in claim 1 wherein said means for gripping said roof panels comprises clamps attached to said longitudinal cogged belts which grip stud pins on said roof panels, said clamps gripping said front panel being attached to one side of each cogged belt and said clamps gripping said rear panel being attached to the other side of each cogged belt.

3. An extendable roof structure for an automobile comprising:
   (i) a roof enclosure mountable on and forming a hollow space with an automobile top and having transverse openings at the front and rear ends with two longitudinal and parallel side frames having flanges and channels to define an "E" shaped cross section having upper and lower channels, the flanges being horizontal and extending toward the inside of said hollow space;
   (ii) front and rear roof panels sandwiched between said two parallel side frames and slideable longitudinally in the lower channel of said "E" cross section so as to be extendable and retractable through said transverse openings; and
   (iii) a power actuating mechanism comprising at least one reversible D.C. drive motor and power transmission means adapted to extend and retract said roof panels out of and into said roof enclosure through said transverse openings, said at least one motor adapted to be connected to a battery via a two-way switch; wherein said power actuating mechanism comprises four pulleys, one pulley being rotatably mounted in the upper channel of each of said "E" cross section side frames at the front and rear ends thereof to form a set of pulleys, one pair of idlers being disposed longitudinally from said pulleys at the center of each side of said roof enclosure, said D.C. motor being mounted in said roof enclosure and driving a worm gear which in turn engages a reducing gear fixed on a drive shaft, a driving cord having one end attached to said drive shaft and the other end passing around one idler of said pair of idlers at one side of said roof enclosure, then longitudinally to one of said pulleys and further to and between one of said sets of pulleys in the frame on said one side, then around the other idler of said pair passing transversely across to the pair of idlers and set of pulleys on the other side of said roof enclosure to pass therearound in the same manner then returning to wind multiple times around said drive shaft and attaching thereto, clamp means being attached to said driving cord at each side of said enclosure to grip said roof panels, rotation of said drive shaft causing said driving cord to move said roof panels in opposite directions simultaneously.

4. An extendable roof structure for an automobile comprising:
(i) a roof enclosure mountable on and forming a hollow space with an automobile top and having transverse openings at the front and rear ends with two longitudinal and parallel side frames having flanges and channels to define an "E" shaped cross section having upper and lower channels, the flanges being horizontal and extending toward the inside of said hollow space;
(ii) front and rear roof panels sandwiched between said two parallel side frames and slideable longitudinally in the lower channel of said "E" cross section so as to be extendable and retractable through said transverse openings; and
(iii) a power actuating mechanism comprising at least one reversible D.C. drive motor and power transmission means adapted to extend and retract said roof panels out of and into said roof enclosure through said transverse openings, said at least one motor adapted to be connected to a battery via a two-way switch; wherein said power actuating mechanism comprises a D.C. motor mounted in the center of said roof enclosure to drive a worm gear which engages a reducing gear mounted on a shaft to which a front gear and a front power sprocket are mounted; said front gear engaging a rear gear mounted on a rear shaft which has a rear power sprocket mounted thereon; a front cogged belt being wound around said front power sprocket and a front end sprocket which is disposed at said front transverse opening under said front roof panel, a front spindle extending horizontally and transversely from said front end sprocket and having a pinion attached to each end thereof, each of said pinions engaging a gear rack longitudinally attached underneath each side of said front roof panel; a rear cogged belt being wound around said rear power sprocket and a rear end sprocket which is disposed at said rear transverse opening under said rear roof panel, a rear spindle extending horizontally and transversely from said rear end sprocket and having a pinion attached to each end thereof, each of said pinions engaging a gear rack longitudinally attached underneath each side of said rear roof panel.

5. An extendable roof structure for an automobile comprising:
(i) a roof enclosure mountable on and vforming a hollow space with an automobile top and having transverse opnings at the front and rear ends with two longitudinal and parallel side frames having flanges and channels to define an "E" shaped cross section having upper and lower channels, the flanges being horizontal and extending toward the inside of said hollow space;
(ii) front and rear roof panels sandwiched between said two parallel side frames and slideable longitudinally in the lower channel of said "E" cross section so as to be extendable and retractable through said transverse openings; and
(iii) a power actuating mechanism comprising at least one reversible D.C. drive motor and power transmission means adapted to extend and retract said roof panels out of and into said roof enclosure through said transverse openings, said at least one motor adapted to be connected to a battery via a two-way switch; wherein said power actuating mechanism comprises a pair of reversible D.C. motors mounted in the center of said roof enclosure, each of said D.C. motor driving a worm gear which engages a reducing gear on the shaft of which is a hollow cylinder within which cylinder is wound a bendable stiff coil with one end of said coil adapted to be fixed on an inside wall of said cylinder and the other end of said coil exiting therefrom through an opening in the outside rim; said exit end of said coil being inserted into and secured to an innermost of a set of telescopic tubes, the other end of the coil being fixed at the middle of the inner edge of the respective roof panel; said telescopic tube having its outside sleeve attached to the frame of said D.C. motor and being oriented longitudinally to said automobile top, the extension or retraction of said telescopic tube moving the respective roof panel outward or inward of said roof enclosure.

6. The extensible roof structure of claim 1 having fastening means for removably securing said structure to a drain gutter on each side of said automobile top.

7. The extensible roof structure of claim 1 wherein said roof enclosure is mounted to a removable carrier rack fastenable to a drain gutter on each side of said automobile top.

8. The extensible roof structure of claim 1 wherein said roof panels are provided with friction reducing means facilitating motion of said roof panels.

9. An extensible roof structure for an automobile comprising:
(i) a roof enclosure mountable on and forming a hollow space with an automobile top and having end openings at the front and rear ends with two longitudinal and parallel side frames; said roof enclosure further having two longitudinal side openings with two side roof panels sandwiched between a pair of parallel and transversely disposed end frames, said side roof panels being slideable sidewardly out of said roof enclosure, and each of said side roof panels has two longitudinal slots at the ends of the inner sides thereof, slideable roller pins being inserted into each slot to pivotally hinge linkage bars at one end of said bars, two linkage bars for each roller pin, the other end of one of said two linkage bars being pivotally hinged to the adjacent end frame, the other end of said other linkage bar of said two linkage bars being pivotally hinged to an inside edge of an adjacent front or rear roof panel, the outward or inward motion of said front and rear roof panels actuating said linkage bars to concurrently extend or retract said roof panels;
(ii) front and rear roof panels sandwiched between said two parallel side frames and slideable longitudinally so as to be extendable and retractable through said end openings; and
(iii) a power actuating mechanism comprising at least one reversible D.C. drive motor and power transmission means adapted to extend and retract said roof panels out of and into said roof enclosure through said transverse openings, said at least one motor adapted to be connected to a battery via a two-way switch, said power transmission means comprising a pair of sprockets rotatably mounted in said end frames at each end thereof, a looped cogged belt being wound between a sprocket from each end frame, each belt being stretched horizontally and longitudinally above said front and rear roof panels and having means attached thereto for gripping said front and rear roof panels, a power cogged belt being wound about the two rear sprockets and extending transversely therebetween to engage a centrally disposed power sprocket which is attached to a reducing gear which engages a worm gear which in turn is rotated by said D.C. motor, said D.C. motor and gearing means further being mounted on said roof enclosure.

* * * * *